(12) United States Patent
Jaksch et al.

(10) Patent No.: US 6,769,395 B2
(45) Date of Patent: Aug. 3, 2004

(54) METHOD, A COMPUTER PROGRAM, AND A CONTROL AND REGULATING UNIT FOR OPERATING AN INTERNAL COMBUSTION ENGINE

(75) Inventors: Werner Jaksch, Hessigheim (DE); Ernst Wild, Oberriexingen (DE); Kristina Eberle, Hardthof (DE); Lutz Reuschenbach, Stuttgart (DE); Thomas Hotz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/951,411

(22) Filed: Sep. 14, 2001

(65) Prior Publication Data
US 2002/0100455 A1 Aug. 1, 2002

(30) Foreign Application Priority Data
Sep. 14, 2000 (DE) .......................................... 100 45 421

(51) Int. Cl.$^7$ .............................................. F02D 41/18
(52) U.S. Cl. ........................ 123/336; 73/118.2; 123/399
(58) Field of Search .................................. 123/336, 361, 123/399, 478, 480, 494; 73/118.2; 701/102, 103, 104

(56) References Cited

U.S. PATENT DOCUMENTS

| | | | | |
|---|---|---|---|---|
| 4,866,620 A | * | 9/1989 | Abe et al. ................ | 123/480 X |
| 5,839,420 A | * | 11/1998 | Thomas ....................... | 123/478 |
| 6,273,077 B1 | * | 8/2001 | Wild ........................... | 123/679 |
| 6,286,492 B1 | * | 9/2001 | Kanno .......................... | 123/684 |
| 6,422,202 B1 | * | 7/2002 | Wild ........................... | 123/399 |

* cited by examiner

Primary Examiner—Tony M. Argenbright
(74) Attorney, Agent, or Firm—Kenyon & Kenyon

(57) ABSTRACT

A method for operating an internal combustion engine. The latter has at least one combustion, one induction pipe, and one throttle valve. From the actual position of the throttle valve, a gas charge of the combustion chamber is defined. To improve the emissions and fuel consumption characteristics of the internal combustion engine, the minimum gas pressure is measured that exists in the induction pipe assigned to the combustion chamber at the end of the intake stroke. From this gas pressure, a value is determined which more closely approximates the actual gas charge of the combustion chamber.

12 Claims, 4 Drawing Sheets

METHOD, A COMPUTER PROGRAM, AND A CONTROL AND REGULATING UNIT FOR OPERATING AN INTERNAL COMBUSTION ENGINE

FIELD OF THE INVENTION

The present invention relates to a method for operating an internal combustion engine having at least one combustion chamber, one induction pipe, and one throttle valve.

BACKGROUND INFORMATION

In modern internal combustion engines having direct fuel injection and/or having an electronic gas pedal, the quantity of gas to be introduced into the combustion chamber is determined, inter alia, according to the quantity of fuel to be injected into the combustion chamber. This is necessary, inter alia, in order to generate a mixture in the combustion chamber in which combustion-generated emissions and fuel consumption are minimized. In this context, the quantity of gas, or the "gas charge," is defined as a function of the actual position of the throttle valve, because the assumption is made that at a defined throttle position only a certain quantity of gas can reach the combustion chamber.

However, the problem in defining the gas charge of the combustion chamber in this manner is that the throttle valves themselves are manufactured within certain tolerances, so that when different throttle valves are set at the same angle, the result can be differing gas charges in corresponding combustion chambers. The gas charge actually present in the combustion chamber can therefore differ from the gas charge defined by the throttle valve position in ways that are not immediately predictable, which makes the creation of an optimal mixture dependent on the accidental presence of a "standard throttle valve."

SUMMARY OF THE INVENTION

The present invention therefore has the objective of refining a method of the type cited above so that the mixture can always be adjusted with great precision.

This objective is achieved as a result of the fact that the minimum gas pressure is measured that is present in the induction pipe assigned to the combustion chamber at the end of the intake stroke, and that from this a value is determined which better approximates the actual gas charge of the combustion chamber.

The method according to the present invention is based on the following consideration: In an internal combustion engine having one intake valve, the piston at the beginning of the intake stroke is located in the upper dead center and then travels to the lower dead center. In this context, the quantity of gas behind the throttle valve continually expands in volume. This has the consequence that the pressure falls. In the lower dead center, the maximum volume and therefore the minimum pressure is achieved. Shortly thereafter, the intake valve closes. At this point in time, roughly the same pressure exists in the combustion chamber as in the induction pipe. By taking account of the characteristic data of the internal combustion engine, the gas charge in the combustion chamber can be calculated from this minimum pressure. Since this gas charge is calculated from the gas pressure that actually exists in the induction pipe, the leakage through the throttle valve and behind the throttle valve due to manufacturing tolerances is taken into account in the gas charge. This value is therefore more precise and can be used to produce mixtures more precisely. The pressure in the induction pipe is preferably measured by a sensor provided in the induction pipe.

In one very advantageous refinement, a gas charge of the combustion chamber is defined from the actual position of the throttle valve, the defined value is compared with the measured value, and then, if the comparison shows that the difference between the measured and the defined gas charge lies outside of a permissible range, the position of the throttle valve is corrected. Therefore, in this refinement, the gas charge measured from the minimum gas pressure and the gas charge defined by the actual position of the throttle valve are combined with each other. In this context, by determining a permissible range, a range of tolerance created, which makes it unnecessary to resort to control interventions too frequently.

In this context, the correction takes place preferably so that the difference between the measured and the defined gas charge is equal to zero. This means that the gas charge is optimized.

The above-mentioned method is particularly well suited for internal combustion engines that have a plurality of combustion chambers and also is particularly well suited for internal combustion engines in which each combustion chamber or a group of combustion chambers (e.g., a cylinder bank) has assigned to it its own induction pipe and its own throttle valve. For this reason, it is proposed in one refinement that the above-mentioned method be carried out independently for a plurality of combustion chambers having their own induction pipe and especially their own throttle valve. In this way, for each individual combustion chamber or for each group of combustion chambers, a value can be calculated which more closely approximates the actual gas charge of this individual combustion chamber, and the position of the throttle valve assigned to this combustion chamber can be corrected. In this manner, the emissions and fuel consumption characteristics of the individual cylinders of the internal combustion engine are optimized.

Correcting the position of the throttle valve can take place in varying ways. One possibility is to correct an offset, usually taken into account in calculating the gas charge, and a slope. This offset is a value which makes it possible to take into account the air leakage streams through gaps between the throttle valve and the wall of the induction pipe and through other leakage points between the throttle valve and the combustion chamber. The slope takes into account the multiplicative errors in the throttle valve system. In response to a difference between the value for the gas charge defined by the actual position of the throttle valve and a value calculated on the basis of the minimal gas pressure, it can be assumed that the offset and the slope do not optimally reflect the actual reality. This can be partially compensated for by correcting the offset as proposed in accordance with the present invention. The same applies to the slope. In this context, the correction can take place in a multiplicative manner, meaning a change in the slope, or in an additive manner, meaning a change in the "offset." A correction of the offset and/or the slope is recommended especially in response to generally low pressure levels in the induction pipe, i.e., in an operating state in which the throttle valve is closed relatively far, because in an operating state of this type the aforementioned leakage streams play a relatively large role.

Intervening in the control of the throttle valve position has the advantage over regulating the throttle valve position directly on the basis of the pressure-based gas charge that the optimal gas charge can be achieved more rapidly and without transient effects. Calculating the gas charge on the basis of the throttle valve position makes it possible to react immediately to a change in the driver's requests. On the other hand, the minimum pressure in one cylinder can only be measured anew after an entire rotation of the camshaft.

At an overall high induction pipe pressure, as is also mentioned in one refinement of the present invention, the regulation of the throttle valve position is influenced. In addition, it is also possible to influence the calculation of a setpoint value of the throttle valve. Both measures make it possible to react quickly to differences between the defined and the measured values.

The precision of the above-mentioned method is even more improved in one refinement which, in calculating the gas charge, takes into account the partial pressure of the internal residual gas.

The present invention also relates to a computer program, which is suited to carrying out the above-mentioned method, if it is executed on a computer. In one preferred refinement of this computer program, it is stored in a storage device, in particular in a flash memory.

Finally, the present invention relates to a control and regulating unit for an internal combustion engine, especially of a motor vehicle, having at least one combustion chamber, one induction pipe, and one throttle valve, the unit defining a gas charge of the combustion chamber from the actual position of the throttle valve. To improve the emissions and fuel consumption behavior of the internal combustion engine, the control and regulating unit is connected to a pressure sensor arranged in the induction pipe, and it determines a value that more closely approximates the actual gas charge from the minimal gas pressure existing in the induction pipe assigned to the combustion chamber at the end of the intake stroke.

Especially preferred is the refinement of the control and regulating unit, in which, if the comparison shows that the calculated gas charge of the combustion chamber does not roughly correspond to the defined gas charge, then a correction signal for the position of the throttle valve is generated.

Finally, a control and regulating unit of this type is particularly advantageous if it is suited for internal combustion engines having a plurality of combustion chambers and a plurality of pressure sensors and throttle valves each assigned to one combustion chamber. This is the case in the refinement in which the control unit is connected to a multiplicity of pressure sensors, each assigned to one combustion chamber, and, in particular, generates a plurality of independent correction signals for the corresponding throttle valves.

DETAILED DESCRIPTION

Figure 1:
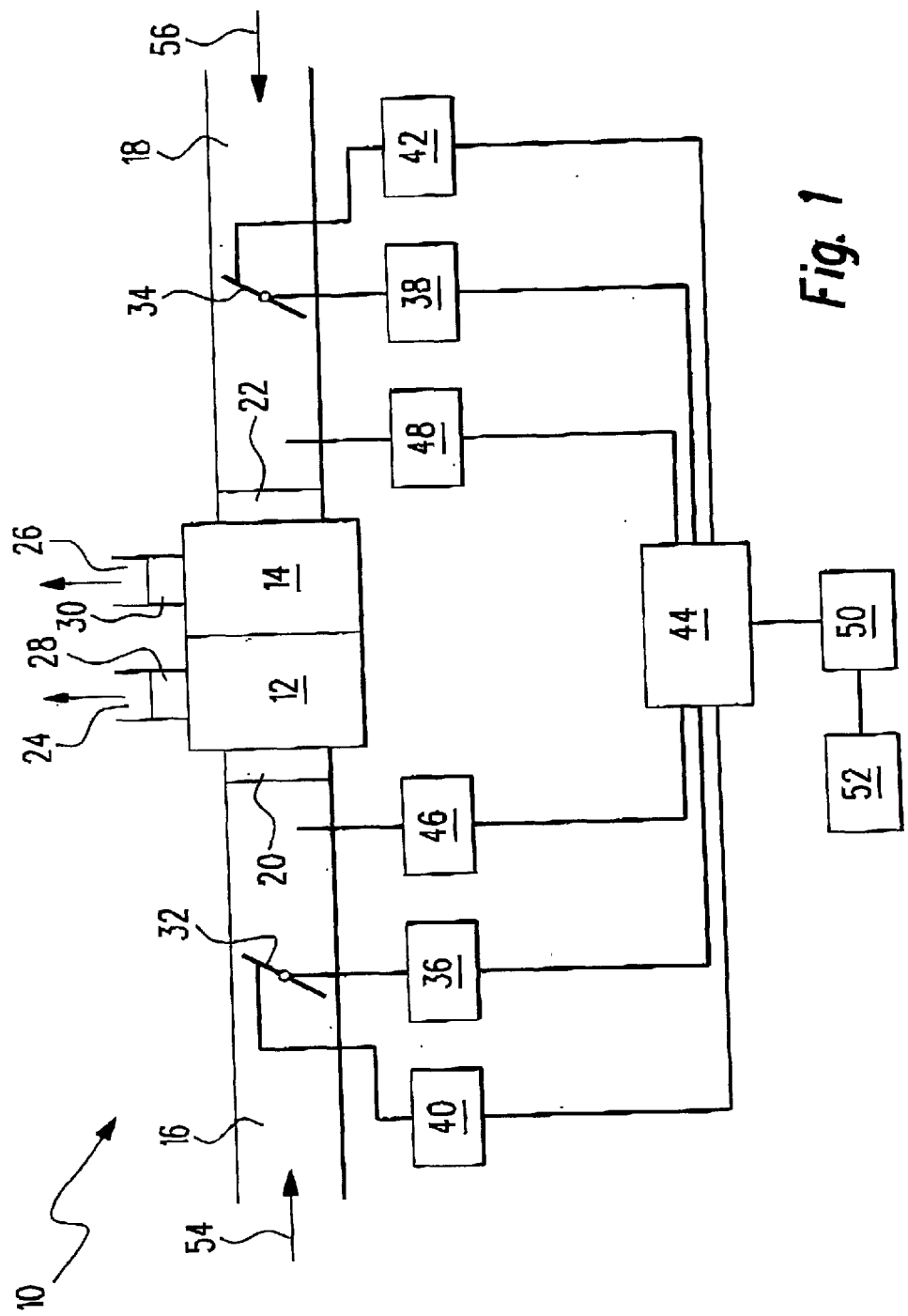
FIG. 1 depicts a schematic representation of components of an internal combustion engine having two combustion chambers.

In FIG. 1, an internal combustion engine is designated overall by reference numeral 10. It has two combustion chambers 12 and 14, each of which is supplied with air via its own induction pipe 16 and 18, respectively. The internal combustion engine can be, e.g., an SI engine having an electronic gas pedal ("e-gas"). The corresponding pistons, etc., are not depicted. In the area of the intake of induction pipe 16 and 18 feeding into combustion chambers 12 and 14, respectively, intake valves 20 and 22 are schematically depicted in FIG. 1. The exhaust gases can escape via exhaust pipes 24 and 26, which are connected via exhaust valves 28 and 30 to combustion chambers 12 and 14, respectively.

Arranged in induction pipes 16 and 18 are throttle valves 32 and 34, whose positions are set by servomotors 36 and 38, respectively. The actual position of throttle valves 32 and 34 is transmitted in each case by position sensors 40 and 42 to a control and regulating unit 44, which in turn drives servomotors 36 and 38, respectively. Between throttle valves 32 and 34 and intake valve 20 and 22, respectively, there are in each case pressure sensors 46 and 48, which measure the pressure in induction pipes 16 and 18 between throttle valves 32 and 34 and intake valves 20 and 22, respectively, during the operation of the internal combustion engine 10. Pressure sensors 46 and 48 also convey corresponding signals to control and regulating unit 44. The latter is also connected to a remote-position indicator 50 of a gas pedal 52.

Figure 2:
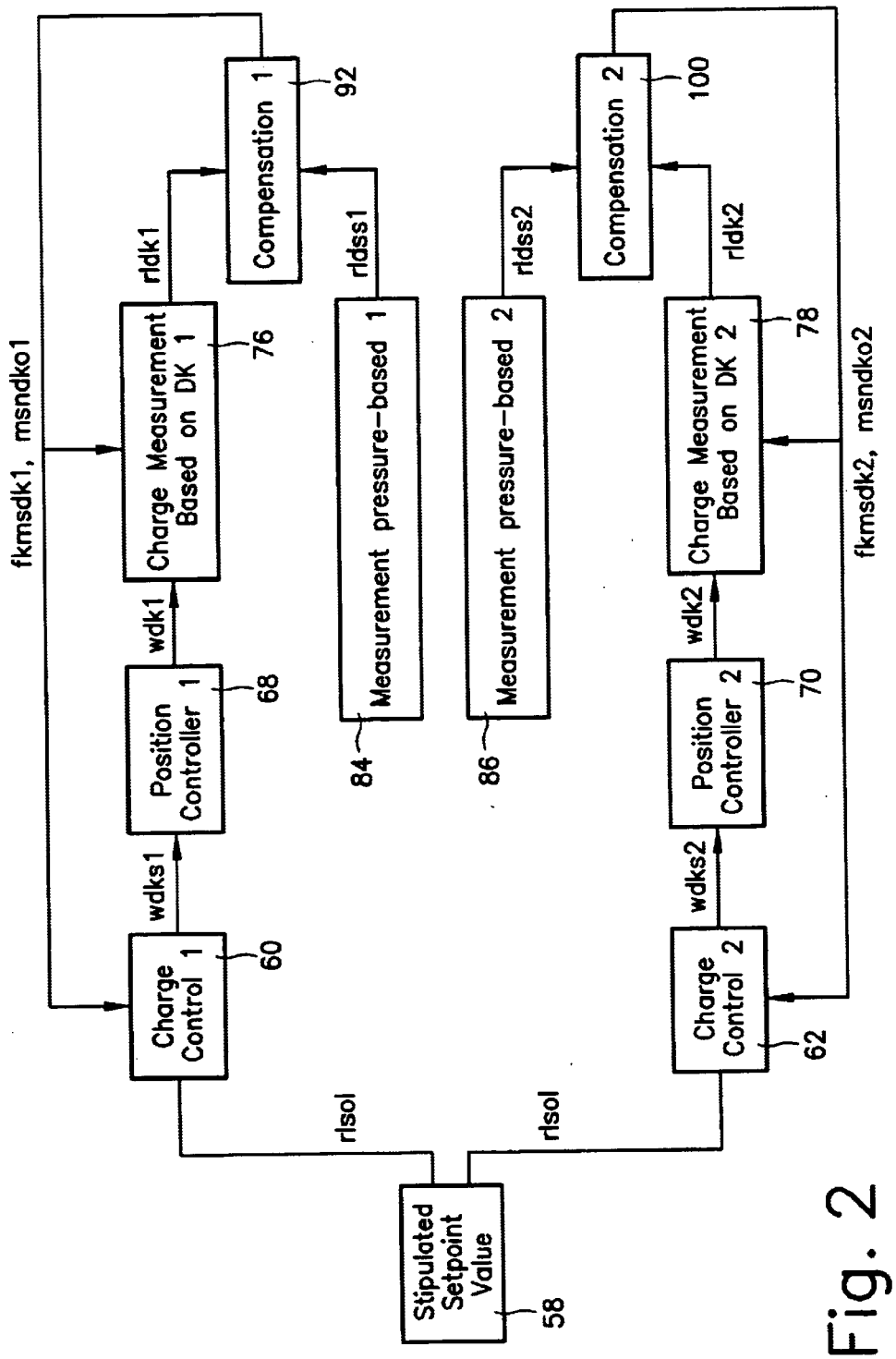
FIG. 2 depicts a simplified representation of a method for operating the internal combustion engine from FIG. 1.
Figure 3:
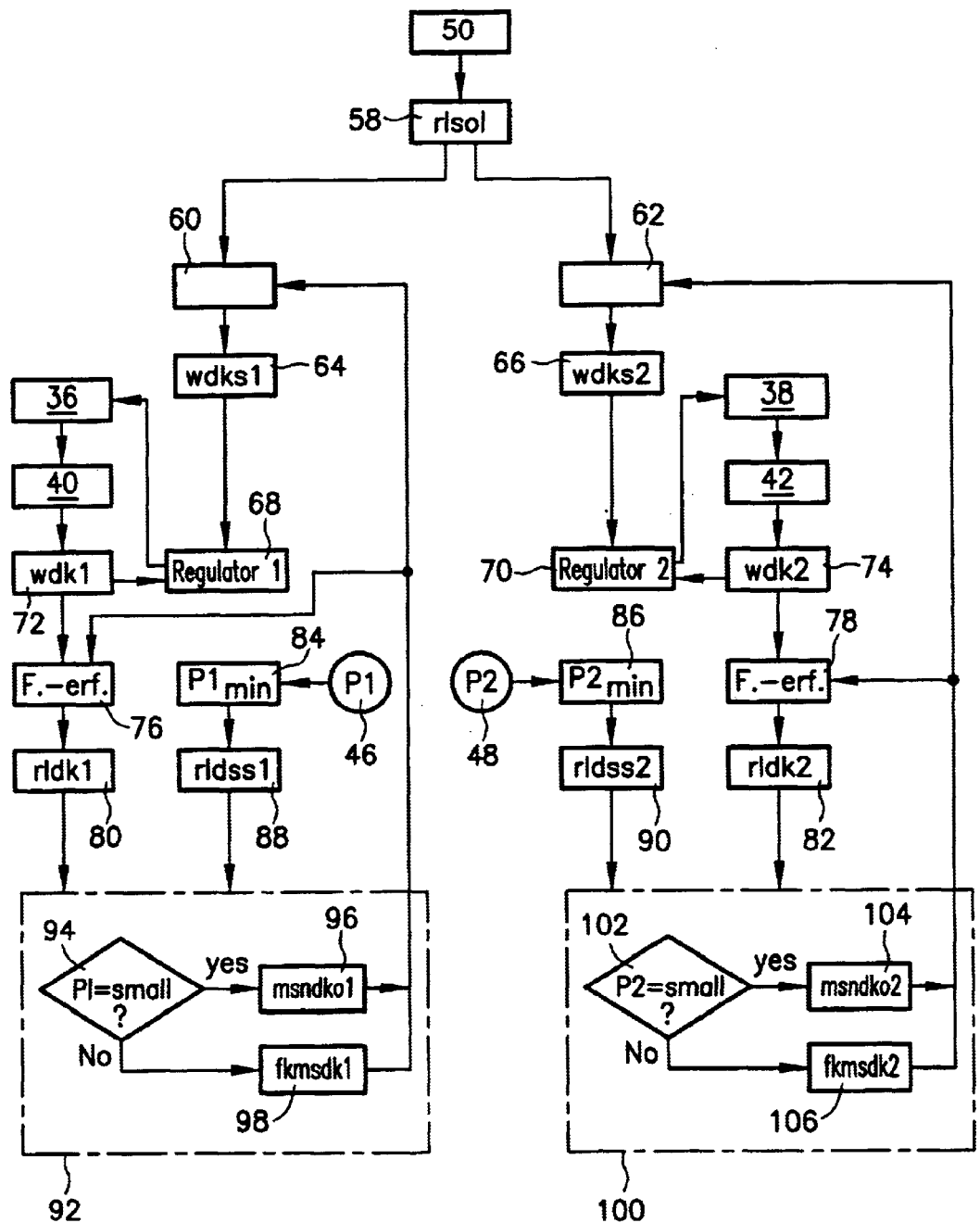
FIG. 3 depicts a detailed flowchart of the method represented in FIG. 2.

The quantity of air flowing through induction pipes 16 and 18 into combustion chambers 12 and 14 (arrows 54 and 56), respectively, is fundamentally influenced by the piston of throttle valves 32 and 34. The control and regulation of the latter is now described with reference to FIGS. 2–4.

First, an air charge setpoint value rlsol is calculated by control and regulating unit 44 as a function of a signal which control and regulating unit 44 receives from remote-position indicator 50 of gas pedal 52. This air charge setpoint value rlsol is identical for both combustion chambers 12 and 14 and represents the gas charge that is optimal for the fuel quantity to be injected. Calculating this value takes place in a block 58.

As a function of air charge setpoint value rlsol, for each throttle valve 32 and 34 in a charge control process 60 and 62, a setpoint wdksl and wdks2 is established for the position of throttle valves 32 and 34, respectively. These setpoint values wdksl and wdks2 are in turn supplied to a position controller 68 and 70, which drives servomotors 36 and 38 of throttle valves 32 and 34, respectively. Actual position wdk1 (block 72) of throttle valve 32 and actual position wdk2 (block 74) of throttle valve 34 are measured by remote-position indicator 40 and 42, respectively, and are conveyed to position controllers 68 and 70, respectively. Position controller 68, servomotor 36, and remote-position indicator 40 as well as position controller 70, servomotor 38, and remote-position indicator 42 therefore constitute a closed control loop.

Actual positions wdk1 and wdk2 of throttle valves 32 and 34,. respectively, are also supplied to a throttle-valve-based charge measurement system 76 and 78, which from supplied values wdk1 and wdk2 in blocks 80 and 82 define a "theoretical" actual position rldk1 for combustion chamber 12 and rldk2 for combustion chamber 14. This gas charge is theoretical because it does not take into account the individual tolerances of throttle valves 32 and 34 and can therefore distinguish these gas charges from the actual gas charges.

Figure 4:
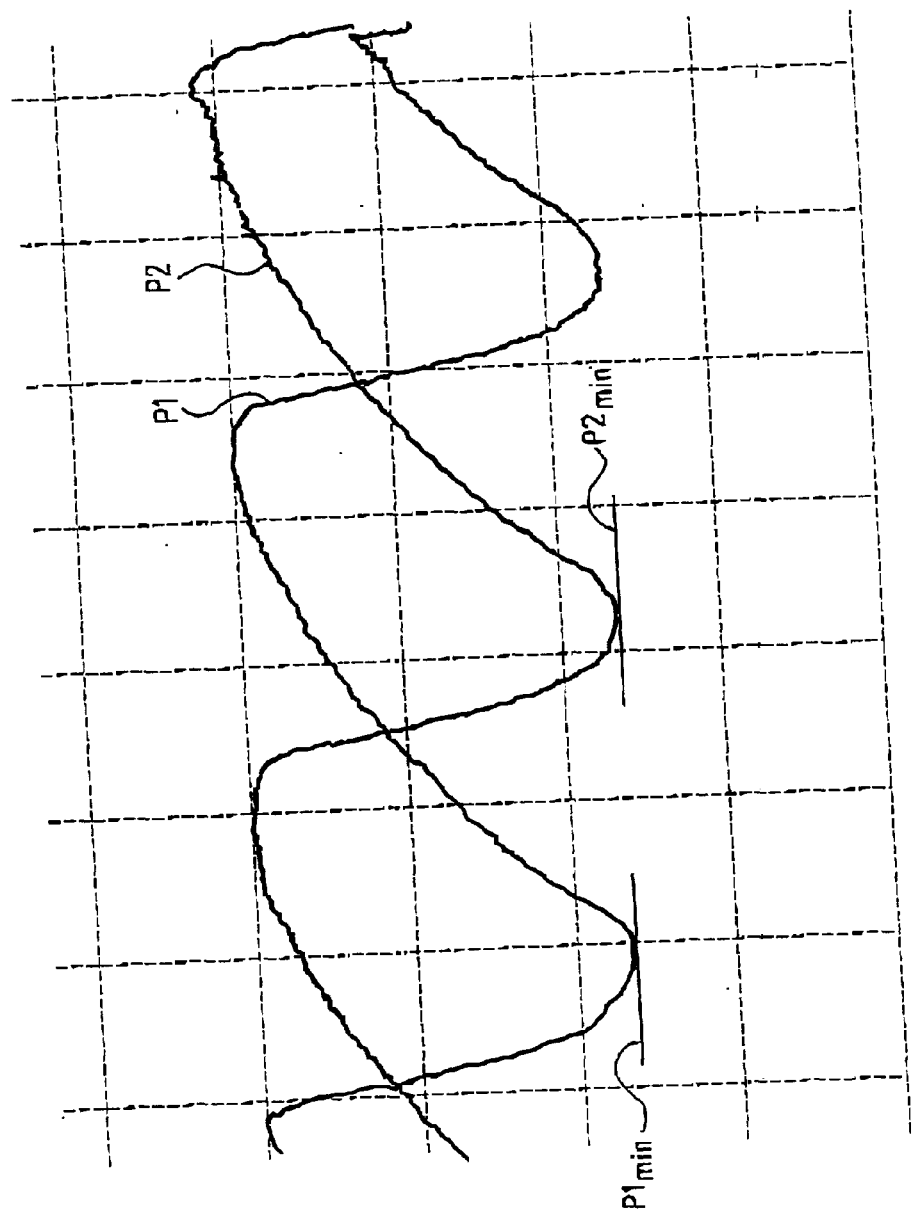
FIG. 4 depicts a diagram of the pressure curves in the induction pipe of the internal combustion engine represented in FIG. 1.

From pressure sensors 46 and 48 arranged in induction pipes 16 and 18, respectively, pressures P1 and P2 are continuously determined which exist in induction pipes 16 and 18, respectively, corresponding to the curves in FIG. 4. Using a minimum value characterizer that is not depicted in the drawing, for each curve P1 and P2, minimum value P1min and P2min is determined in blocks 84 and 86, respectively.

Both of these pressures P1min and P2min are the pressures at the end of the intake stroke and this is so for the following reason: when intake valves 20 and 22 open during the charge changing phase, the (undepicted) piston is situated at the upper dead center and then travels to the lower dead center. In this context, the gas quantity behind throttle valve 32 and 34 expands to an ever greater volume, and the pressure therefore falls. At the lower dead center, the maximum volume; and therefore minimum pressures P1min and P2min are reached.

Shortly thereafter, intake valves 20 and 22 close. Pressures P1min and P2min, measured in induction pipes 16 and 18, closely approximate the pressure in combustion chambers 12 and 14, respectively, from which the charge can be calculated.

In a computing loop that is also not depicted in the drawing, from minimum pressure values P1min and P2min, gas charge rldss1 (block 88) and rldss2 (block 90) are calculated, which more closely correspond to the actual gas charge.

Gas charge rldk1 (block 80) in combustion chamber 12, defined by the position of throttle valve 32, is now compared in a comparator 92 to gas charge value rldss1 (block 88), calculated from minimum pressure P1min in induction pipe 16. In response to a difference between two gas charges rldk1 and rldk2, a query is raised in comparator 92 in block 94 as to whether pressure level P1 in induction pipe 16 is relatively low overall. This is the case, e.g., when throttle valve 32 is closed relatively far. If the answer in block 94 is yes, then learned additive quantity msndko1, representing a measure for the air leakage streams through throttle valve 32 and behind this throttle valve 32, is changed. Quantity msndko1 is used for correcting the charge measurement in block 76 and for correcting the charge control in block 60.

If the answer in block 94 is no, then a multiplicative correction of the charge measurement in block 76 and of the charge control in block 60 is carried out by a factor fkmsdk1. (block 98).

Analogously, for other combustion chamber 14, a comparator 100, a decision block 102, and correction quantities msndko2 (block 104) and fkmsdk2 (block 106) are provided. In this manner, despite identical setpoint value rlso1 (block 58) for both combustion chambers 12 and 14, different setpoint angles wdks1 and wdks2 result in blocks 64 and 66, which compensate for the tolerance differences between two throttle valves 32 and 34, respectively.

Monitoring the normal operation of the method can be carried out in a simple manner: The pressure signal made available by pressure sensors 46 and 48 is superposed on a minimum, which is smaller than p1min and p2min in blocks 84 and 86 and which does not coincide temporally with the closing of intake valves 20 and 22, respectively. The charge measurements in blocks 76 and 78 in blocks 80 and 82 now supply a value rldk1 and rldk2 that is too small. The system (controller 68 and 70) must now react to a leak behind a throttle valve 32 and 34, simulated in this manner, by closing upstream throttle valve 32 and 34.

What is claimed is:

1. A method for operating an internal combustion engine that has at least one combustion chamber, an induction pipe, and a throttle valve, the method comprising:

measuring a minimum gas pressure with aid of a minimum-value selection;

determining, as a function of the measured minimum gas pressure, a value which more closely approximates an actual gas charge of the combustion chamber;

defining a gas chamber of the combustion chamber from an actual position of the throttle valve;

comparing the defined gas charge with a measured gas charge; and correcting a position of the throttle valve if the comparison reveals that a difference between the defined gas charge lies outside a preselected range.

2. A method according to claim 1, wherein the position of the throttle valve is corrected so that the difference between the defined charge and the measured gas charge is about zero.

3. A method according to claim 1, wherein the measurement and the determination are carried out for a plurality of combustion chambers of the engine, independently of each other.

4. A method according to claim 1, further comprising correcting a leakage value.

5. A method according to claim 4, further comprising wherein the leakage value is corrected only in response to an overall pressure level in the induction pipe.

6. A method according to claim 1, further comprising influencing a regulation of the throttle valve at a high overall pressure level in the induction pipe.

7. A method according to claim 1, further comprising:
calculating a set-point value of the throttle valve; and
influencing a calculation of a set-point value.

8. A method according to claim 1, further comprising taking into account a partial pressure of an internal residual gas, in response to determining a gas charge.

9. A storage medium storing a computer program which, when executed by a processor, performs the following;

measuring a minimum gas pressure with aid of a minimum-value selection; determining, as a function, of the measured minimum gas pressure, a value which more closely approximates an actual gas charge of the combustion chamber defining a gas charge of the combustion chamber from an actual position of a throttle valve;

comparing the defined gas charge with a measured gas charge; and correcting a position of the throttle valve if the comparison reveals that a difference between the defined gas charge and the measured charge lies outside a preselected range.

10. The storage medium according to claim 9, wherein the storage medium is a flash memory.

11. A control and regulating unit for an internal combustion engine of a motor vehicle having at least one combustion chamber, an induction pipe, and a throttle valve, the control and regulation unit being connected to a pressure sensor arranged in the induction pipe, the control and regulating unit comprising:

an arrangement for defining a gas charge of the combustion chamber from the actual position of the throttle valve;

an arrangement for determining a value that more closely approximates an actual gas charge from a minimum pressure detected with aid of a minimal-value selection; and an arrangement for generating a correction signal for a position of the throttle valve if a comparison reveals that a difference between a measured gas charge of the combustion chamber and a defined gas charge lies outside of a permissible range.

12. A method according to claim 11, wherein the engine includes a plurality of pressure sensors connected to the control and regulating unit, a plurality of combustion chambers corresponding to the plurality of pressure sensors, and a corresponding plurality of throttle valves, and further comprising an arrangement for generating signals for the corresponding valves.

* * * * *

UNITED STATES PATENT AND TRADEMARK OFFICE
CERTIFICATE OF CORRECTION

PATENT NO. : 6,769,395 B2
DATED : August 3, 2004
INVENTOR(S) : Werner Jaksch et al.

It is certified that error appears in the above-identified patent and that said Letters Patent is hereby corrected as shown below:

Column 6,
Line 6, change "defining a gas chamber" to -- defining a gas charge --
Line 12, change "a difference between the defined gas charge lies" to
-- a difference between the defined gas charge and the measured charge lies --
Line 42, change "...combustion chamber defining a gas charge..." to
-- ...combustion chamber; defining a gas charge... --

Signed and Sealed this

Twenty-first Day of June, 2005

JON W. DUDAS
*Director of the United States Patent and Trademark Office*